Jan. 20, 1948.  E. B. FEASTER  2,434,793
ELECTRIC CORD
Filed Nov. 11, 1944  2 Sheets-Sheet 1
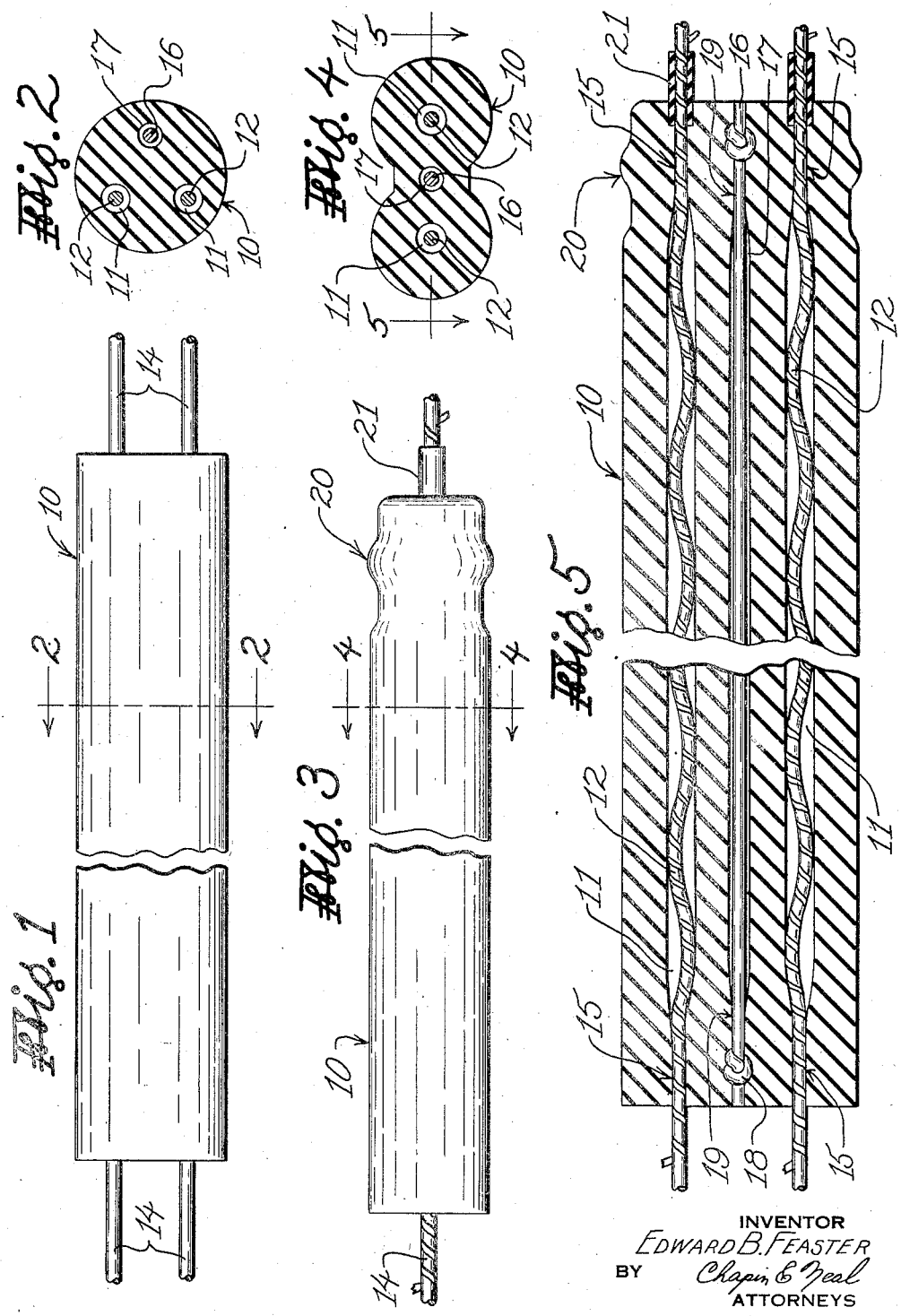
INVENTOR
EDWARD B. FEASTER
BY Chapin & Neal
ATTORNEYS Jan. 20, 1948.    E. B. FEASTER    2,434,793
ELECTRIC CORD
Filed Nov. 11, 1944    2 Sheets-Sheet 2
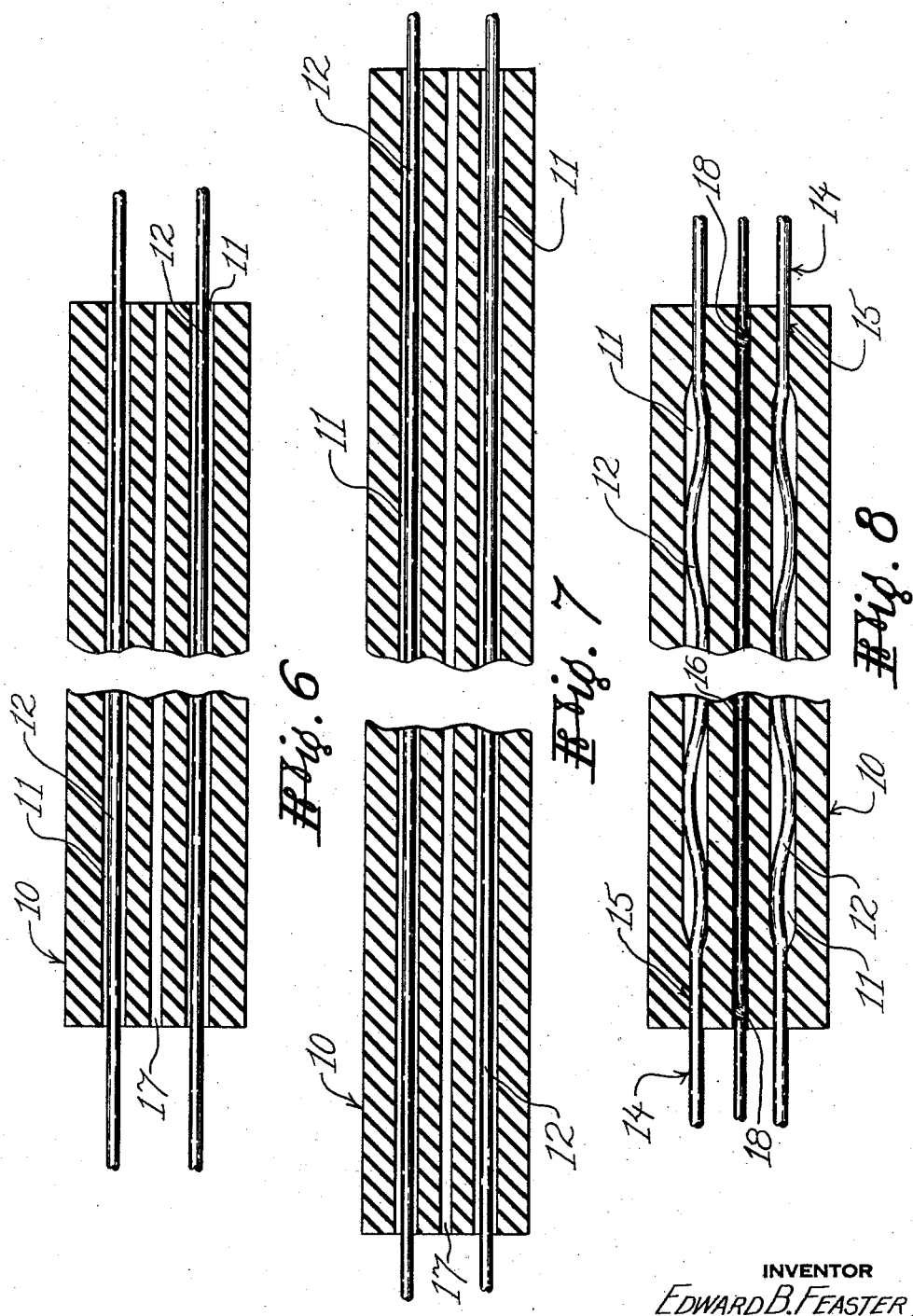
INVENTOR
Edward B. Feaster
BY Chapin & Neal
ATTORNEYS Patented Jan. 20, 1948

2,434,793

UNITED STATES PATENT OFFICE 2,434,793

ELECTRIC CORD

Edward B. Feaster, Springfield, Mass.

Application November 11, 1944, Serial No. 562,968

3 Claims. (Cl. 174—113)

This invention relates to an improved insulated electric conductor or cord such as telephone cords used in switchboards or on telephone instruments, and to cords for use with electric irons, toasters, lamps and electric appliances in general.

The principal objective of the invention is to provide a cord of the above character which shall have increased flexibility, and one in which the likelihood of breaking the wire conductor elements when the cord is sharply bent is eliminated or greatly minimized. A further object is to provide a cord of increased tensile strength and one in which the wire conducting elements are not called on to resist tensile strain when the cord is pulled from its socket or a tensile load otherwise placed upon it.

Other and further objects residing in the details of its construction will be made apparent in the following specification and claims.

In the accompanying drawings which show illustrative embodiments of the invention;

Fig. 1 is a side view of a cord embodying the invention, showing the end and adjacent portions, the middle portion being broken away;

Fig. 2 is a sectional view taken on line 2—2 of Fig. 1;

Fig. 3 is a view similar to Fig. 1 but showing an alternative form of the invention, and showing its use with a different type of conductor;

Fig. 4 is a sectional view taken on line 4—4 of Fig. 3;

Fig. 5 is a sectional view substantially on line 5—5 of Fig. 4; and

Figs. 6, 7 and 8 are sectional views similar to Fig. 5 but illustrating successive steps in forming the cord.

Referring to the drawings the cord is shown as comprising an insulating sheath 10 which may be round in cross section as shown in Figs. 1 and 2 or may have any other suitable cross sectional shape such as that shown in Fig. 4.

The sheath may be made of any suitable insulating material, natural or synthetic rubber being a preferred material. The sheath 10 is provided with one or more longitudinal conduits 11 extending longitudinally through the sheath. The number of conduits will correspond to the number of conducting wires desired in the cord, two conduits are shown in the drawings this being the usual number desired in cords for most appliances.

A flexible electric conductor 12 is positioned within and extending through each conduit 11. The conductor 12 will take the form suitable to the particular use to which the cord is to be put. It may, for example, comprise a solid or stranded copper cable, or if intended for use on telephone instruments or switchboards it may comprise a flat metal element spirally wound on a flexible fibrous core as is common in telephone practice. This latter type is illustrated in Figs. 4 and 5. In any case the conductor may be, and preferably is bare of insulation, and the fullest advantages of the invention are realized with uninsulated conductors. It will be understood however that the invention is not limited to uninsulated conductors and that where underwriter's regulations or municipal codes require some degree of insulation insulated conductors may be used. However under the latter conditions the invention permits and preferably employs the minimum insulation on the conductors allowed by such regulations and codes.

As best shown in Fig. 5 the conduits 11 are larger in diameter than the conductors encased therein. Preferably the diameter of the conduits is 1½ to 2 times the diameter of the conductors. According to this invention a greater length of conductor is positioned in each conduit than the normal length of the conduit itself, the conductor thus being caused to assume a sinuous shape, as shown, permitted by the greater diameter of the conduit as compared with the diameter of the conductor. The conductors are held in their sinuous form by connecting the end portions of the conductors to the end portions of the cord as by vulcanizing the end portions of the sheath to the conductors as indicated at 15. By this arrangement when tension is applied to the cord a substantial elongation of the sheath may take place before any tension is applied to the conducting wires, the latter merely approaching a straight unstressed condition as the sheath is elongated or bent. According to this invention the conductors are provided with a "slack" within the insulating sheath. As distinguished from conventional "extensible" cords or sheaths where the conductors are given a coiled or tight spiral shape, the slack provided according to the present invention may be wholly irregular. While the amount of slack provided may vary somewhat depending on the intended use of the cord a slack of one inch in a six foot length of cord will in general be found satisfactory. It may be further pointed out that since the conductors are freely flexible, and within the confines of the insulating sheath are free to move relative to the insulating sheath, the slackness in the conductors may shift longitudinally or transversely of the insulating sheath. While due to a particular method of inserting the conductors in the sheath, the slack may initially have a regular form and distribution within and along the conduits, the conductors may readjust themselves within the sheath, with a consequent change in the shape and position of the slack, to conform to the requirements of the use to which the cord is put and in response to changes in the conditions of use as such changes occur.

The sheath may be so compounded as to have strength and elongation factors such that the wires are never brought under substantial tensile strain under any usual working conditions. Preferably, however, the sheath is provided with a longitudinal reenforcement 16 such as a textile string or cord, having relative high tensile strength and low extensibility. To receive the reenforcement the sheath is provided with a conduit 17 extending therethrough.

In one manner of constructing the cord, when the sheath is formed of rubber or the like, conductors 12 of desired form are threaded into or otherwise positioned in the conduits 11 of the insulating sheath as shown in Fig. 6. The sheath is then stretched lengthwise as shown in Fig. 7 and its end portions vulcanized to the wires while the sheath is held stretched. Upon release of the sheath it returns to its normal length, the excess length in the wire between the points of attachment to the sheath forming itself into the slack, floating, irregularly sinuous form shown in Fig. 8. A sufficient length 14 of the conductors is left extending beyond the ends of the sheath for connection to the desired terminal members such as plugs or sockets.

The reenforcing textile cord 16 is threaded into or otherwise positioned in the conduit 17 when the sheath is in its normal unstretched position, as shown in Fig. 8. Preferably knots 18 are formed adjacent the ends of the reenforcement to lie within the conduit 17 adjacent the ends of the sheath. The cable is drawn taut and the end portions of the sheath vulcanized as indicated at 19, Fig. 5 to the end portions of the cable, including the knots 18. The extending ends of the reenforcement may then be cut off, as shown in Fig. 5, or if desired sufficient length of the reenforcement may be left to permit it to be attached to the terminal plugs or sockets to which the conductors are connected Where desirable one or both ends of the insulating sheath may be molded to any predetermined shape, as illustrated at 20 in Figs. 3 and 5, to provide for receiving clamping means for a plug or other terminal structure. Also in case the portions of the conductors extending beyond the sheath 10 require insulation such insulation may be supplied by threading over the ends of the conductors a small piece of tubing 21, formed of rubber or other insulating material, with the inner ends of the tubes telescoped within the conduits 11 as best shown in Fig. 5. The tubes 21 may be vulcanized or molded to the sheath and conductors, or otherwise secured in position.

The general cord structure above described has many advantages over previous cord structures and overcomes many of the difficulties and weaknesses present in conventional telephone and appliance cords. For example the wire conductors float freely in the insulating sheath and both this fact and the unstressed sinuous shiftable slack provided in the wires result in an extremely flexible cord. As the insulating sheath is bent the sheath can slide freely on the conductors, that is the conductors offer no stiffening resistance to the bending of the sheath as occurs when the insulation is bound to the conductors. Furthemore the slackness in the conductors permit the latter to bend freely and without stress from any strain imposed on the sheath. Tensile stress in the cord, resulting from the practice of pulling the cord from a wall or appliance socket for example, is taken by the reenforcement 16 and without straining the conductors. Since the reenforcement is preferably free from attachment to the sheath except at the ends it does not stiffen the cord as a whole. The substantial freedom of the several parts of the cord with respect to each other provides a remarkably flexible, strong and efficient, long lived cord since each element is permitted to perform its special function in the best way and without interference from the other elements.

I claim:

1. A conductor cord for electrical appliances which comprises a bodily flexible insulating sheath having a plurality of conduits extending longitudinally thereof, a flexible conductor located within each conduit and of a length greater than that of the conduit, each conductor being sealed to the sheath at each end of its conduit, and a relatively non-extensible reinforcing member extending from one end to the other of the sheath, symmetrically positioned with respect to the conductors, and secured to the sheath at its ends, whereby the cord may be flexed laterally without imposing strain on the conductors.

2. A conductor cord for electrical appliances which comprises a bodily flexible insulating sheath having a plurality of symmetrically arranged conduits extending longitudinally nearly to the ends of the sheath, a flexible conductor located within each conduit and of a length greater than that of the conduit, each conductor being sealed to the sheath at each end of its conduit, an additional conduit positioned centrally with the sheath and symmetrically with respect to the conductor-containing conduits, and a relatively non-extensible reinforcing member extending from one end to the other of the sheath within said additional conduit and secured to the sheath at its ends, whereby the cord may be flexed laterally without imposing strain on the conductors.

3. A conductor cord for electrical appliances which comprises a bodily flexible insulating sheath having a plurality of symmetrically arranged conduits extending longitudinally nearly to the ends of the sheath, a flexible uninsulated conductor located within each conduit and of a length greater than that of the conduit, each conductor being sealed to the sheath at each end of its conduit, said conduits being of a diameter on the order of 1½ to 2 times the diameter of the conductors, an additional conduit positioned centrally within the sheath and symmetrically with respect to the conductor-containing conduits, and a relatively non-extensible reinforcing member extending from one end to the other of the sheath within said additional conduit and secured to the sheath at its ends only, whereby the cord may be flexed laterally without imposing strain on the conductors.

EDWARD B. FEASTER.

REFERENCES CITED

The following references are of record in the file of this patent:

UNITED STATES PATENTS

| Number | Name | Date |
| --- | --- | --- |
| 1,978,591 | Meiwald | Oct. 30, 1934 |
| 1,988,816 | Smith | Jan. 22, 1935 |
| 1,994,886 | Doane | Mar. 19, 1935 |
| 2,119,393 | Lewis et al. | May 31, 1938 |
| 2,234,745 | Von Rarrel | Mar. 11, 1941 |
| 2,274,087 | Morten | Feb. 24, 1942 |